US010826754B1

(12) United States Patent
Tang (10) Patent No.: US 10,826,754 B1
(45) Date of Patent: Nov. 3, 2020

(54) DETECTING MALFUNCTION OF MOBILE BROADBAND MODEMS BASED ON RESPONSE PATTERNS

(71) Applicant: Microsoft Technology Licensing, LLC, Redmond, WA (US)

(72) Inventor: Shaohua Tang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/428,776

(22) Filed: May 31, 2019

Related U.S. Application Data

(60) Provisional application No. 62/834,300, filed on Apr. 15, 2019.

(51) Int. Cl.
*H04L 12/24* (2006.01)
*H04L 1/24* (2006.01)

(52) U.S. Cl.
CPC ............ *H04L 41/0622* (2013.01); *H04L 1/24* (2013.01); *H04L 41/064* (2013.01); *H04L 41/0627* (2013.01); *H04L 41/0672* (2013.01); *H04L 41/0681* (2013.01)

(58) Field of Classification Search
CPC ..... H04L 41/0622; H04L 1/24; H04L 41/0627; H04L 41/064; H04L 1/0681; H04L 1/0672
See application file for complete search history.

(56) References Cited

U.S. PATENT DOCUMENTS

| 6,856,600 B1 | 2/2005 | Russell et al. |
| 9,319,512 B2 * | 4/2016 | Krinsky .................... H04L 1/18 |
| 2012/0278654 A1 | 11/2012 | Shen et al. |
| 2018/0367290 A1 * | 12/2018 | Jin ........................ H04L 1/1867 |

FOREIGN PATENT DOCUMENTS

SG        174690 A1        10/2011

OTHER PUBLICATIONS

"International Search Report and Written Opinion Issued in PCT Application No. PCT/US2020/025855", dated Jul. 17, 2020, 13 Pages.

* cited by examiner

*Primary Examiner* — Shean Tokuta (57) ABSTRACT

A computerized method and system for detecting malfunction of a modem of a computing device is described. Based on receiving a request to be sent to the modem, a countdown timer associated with the received request is started and, based on receiving a response to the request from the modem, the countdown timer associated with the request is stopped. A quantity of consecutive failed requests that have occurred since the last successful request is tracked, wherein a failed request occurs when a countdown timer associated with the request expires prior to being stopped based on receiving a response to the request. Based on the tracked quantity of consecutive failed requests matching or exceeding an adaptable failure threshold of the modem, a malfunction alert associated with the modem is triggered, whereby the computing device is enabled to promptly detect and handle modem malfunctions while avoiding false malfunction detection.

20 Claims, 6 Drawing Sheets

DETECTING MALFUNCTION OF MOBILE BROADBAND MODEMS BASED ON RESPONSE PATTERNS

CROSS-REFERENCE TO RELATED APPLICATION

This application is a non-provisional of U.S. Provisional Patent Application Ser. No. 62/834,300, filed Apr. 15, 2019, entitled "Detecting Malfunction of Mobile Broadband Modems Based on Response Patterns," the entirety of which is hereby incorporated by reference herein.

BACKGROUND

Modern computing devices, such as PCs, intelligent edge computing devices, Internet of Things (IoT) devices, and massive Machine-Type-Communication devices such as robots and self-driving cars, rely heavily on constant or consistent network connections. These devices include mobile broadband (MBB) modems (e.g., cellular communication-based modems) as a key and critical component, enabling connection to the Internet or other networks when outside of local area networks (LANs) or wireless networks (e.g., Wi-Fi networks). Due to the degree to which modern devices rely on network connections, detection of and non-intrusive recovery from malfunction of a device's MBB modem by an operating system of the device presents an important challenge.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for detecting malfunction of a modem of a computing device is described. Based on receiving a request to be sent to the modem, a countdown timer associated with the received request is started and, based on receiving a response to the request from the modem, the countdown timer associated with the request is stopped. A quantity of consecutive failed requests that have occurred since the last successful request is tracked, wherein a failed request occurs when a countdown timer associated with the request expires prior to being stopped based on receiving a response to the request. Based on the tracked quantity of consecutive failed requests matching or exceeding an adaptable failure threshold of the modem, a malfunction alert associated with the modem is triggered, whereby the computing device is enabled to perform modem recovery actions based on the triggered malfunction alert.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Aspects of the disclosure provide a computerized method and system for detecting malfunction of a modem of a computing device based on modem response patterns. The operating system (OS) and the modem of the computing device are configured to communicate via a request-response protocol. Timers are started based receiving requests to be sent to the modem and, upon receiving responses associated with the requests, the associated timers are stopped. Failed requests, which occur when a timer associated with a request expires prior to being stopped based on receiving a response to the request or the modem otherwise fails to respond to the request, are detected, and the quantity of failed requests that have occurred since a last successful response of the modem is tracked. Based on the tracked quantity of consecutive failed requests matching or exceeding an adaptable failure threshold of the modem, a malfunction alert associated with the modem is triggered. The triggered malfunction alert may be provided to other components of the computing device or otherwise enable the computing device to perform recovery actions on the modem.

The described systems and methods address the challenges of efficient, accurate detection of, and non-intrusive recovery from, modem malfunctions. Such detection processes enable the OS to provide modem malfunction alerts which may be handled by the OS or other applications to perform recovery actions to recover from the malfunction.

The described disclosure operates in an unconventional way at least by enabling a computing device to compute the count of consecutive request timeouts or failed requests (e.g., requests that do not receive responses before expiration), except for timeouts for requests which were sent earlier than any request that has received a response. In this manner, transient errors are ignored. When the count of consecutive request timeouts reaches a defined adaptable threshold, a serious malfunction of the modem is signified and the OS triggers or generates an alert associated therewith. Further, the OS or other applications may be configured to take recovery actions based on the malfunction alert being triggered. In some examples, the disclosure relies only on the contract of request-response pairs and the pattern of the responses from the modem. The disclosure does not impose additional requirements on the modem and it is more cost effective than other malfunction-detecting solutions that impose additional requirements on the modem.

Further, by excluding failed requests associated with requests sent earlier than any request that has received a response (e.g., the last or latest successful request), the disclosure avoids triggering false malfunction alerts based on failed requests when then functionality of the modem is indicated by a successful request. In such an event, the modem may have suffered a transient failure from which it has recovered, such that the OS does not need to take any recovery actions.

Additionally, by only triggering a malfunction alert based on a failure threshold being matched or exceeded, the disclosure enables flexible configuration of the computing device, such that malfunction alerts are not triggered in situations where the modem fails to respond to a few requests but then recovers. A single failed request or a few failed requests do not always indicate a malfunction that is serious enough to merit the performance of recovery actions by the OS or entity other than the modem. As a result, unnecessary recovery actions that may negatively affect the performance of the associated computing device are avoided.

Figure 1:
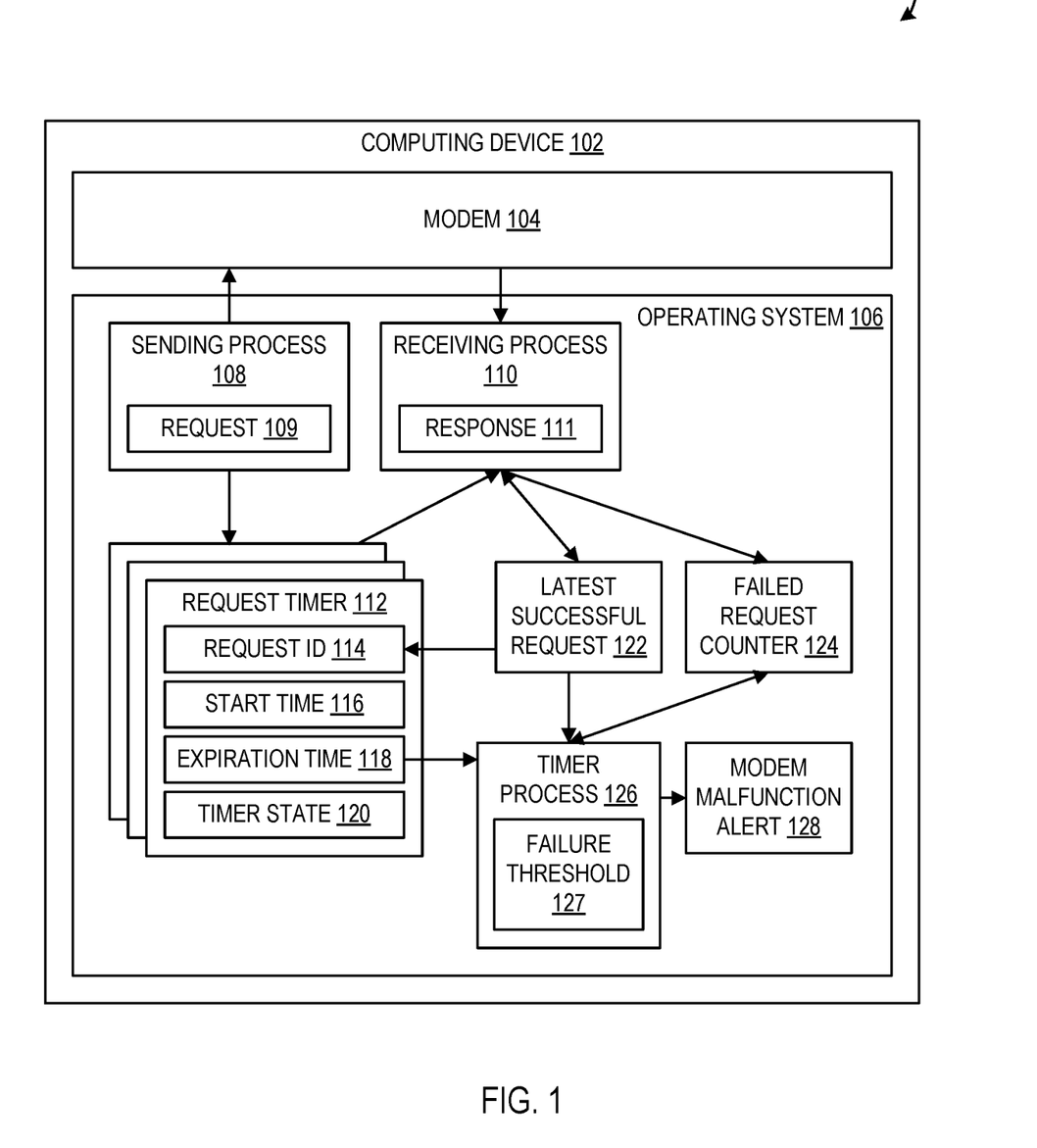
FIG. 1 is a block diagram illustrating a system including a computing device configured to detect modem malfunctions of a modem according to an embodiment.

FIG. 1 is a block diagram illustrating a system 100 including a computing device 102 configured to detect modem malfunctions of a modem 104 according to an embodiment. The computing device 102 includes an operating system (OS) 106 and modem 104 and is configured to perform the modem malfunction detection operations as described herein. The OS 106 is configured to interact with the modem 104 by sending requests 109 via a sending process 108 and receiving responses 111 via a receiving process 110. A request 109 from the OS 106 instructs the modem 104 to perform associated actions. The modem 104 performs the requested actions and, after completion, sends back a response 111 to the OS 106. The OS 106 is configured such that each request-response pair has a defined length of time within which the requested actions must be completed by the modem 104. The defined length of time is measured and/or tracked by a request timer 112 for each request-response pair.

In some examples, the interaction between the OS 106 and the modem 104 is configured with the following characteristics:
- A functioning modem 104 typically responds to requests 109 within the defined time.
- A response 111 carries the identity of the corresponding request 109, such that the OS 106 can correlate the response 111 to its request 109.
- A modem 104 may miss a request 109 or fail to respond in time occasionally without resulting in a malfunction or disastrous failure. The system 100 is configured to include a degree of tolerance for occasional missed actions.
- Unnecessary recovery actions by the OS 106 on the modem 104 can cause more problems than they resolve in many cases and are to be avoided.
- Consistently missed responses 111 by the modem 104 indicates a fatal malfunction of the modem 104.
- The OS 106 should take recovery actions as soon as possible to recover from malfunction of the modem 104 after it is detected.

The response-pattern-based method for detecting malfunction of the modem consists of three processes, the sending process 108, receiving process 110, and timer process 126, as illustrated in FIG. 1. In some examples, the processes are executed in parallel threads by the OS 106 and/or at the kernel level of the computing device 102 and/or computing system 100. The sending process 108 includes software, firmware, and/or hardware configured to send requests 109 to the modem 104.

Figure 2:
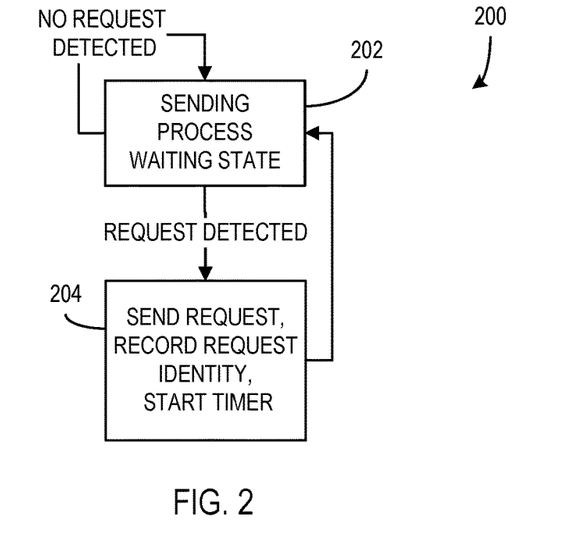
FIG. 2 is a state diagram illustrating operations of a sending process of a modem malfunction detection system according to an embodiment.

FIG. 2 is a state diagram 200 illustrating operations of a sending process 108 of a modem malfunction detection system 100 according to an embodiment. The sending process 108 is configured to detect and/or receive requests to be sent to the modem in a waiting state 202. Requests 109 sent to the modem 104 by the sending process 108 are received from other portions of the OS 106 or other applications on the computing device 102 (e.g., requests to form network connections, requests to obtain data over network connections, etc.). For each request 109 detected by the sending process 108 in the waiting state 202, the sending process 108 sends the request 109, records the identity of the sent request 109 (e.g., the request ID), and the time the request 109 is sent (e.g., the start time 116) in a request timer 112. The request timer 112 is then started for the request 109 and the timer 112 is set to expire at an expiration time 118 based on a defined time allowed for responses 111. In some examples, the timer 112 is a countdown timer that starts counting down from the expiration time 118. In other examples, the timer 112 starts at zero and expires at the expiration time 118.

The request timer 112 further includes a timer state 120 for tracking whether the timer 112 is active (e.g., the timer 112 has not expired and a response 111 has not been received) or inactive (e.g., the timer 112 has expired or it has been stopped due to a response 111 being received). Over time, many requests 109 are detected and sent by the sending process 108 and corresponding request timers 112 are instantiated as described. At any time, some of the timers 112 may be stopped, some of the timers 112 may be expired, and/or some of the timers 112 may still be running.

Figure 3:
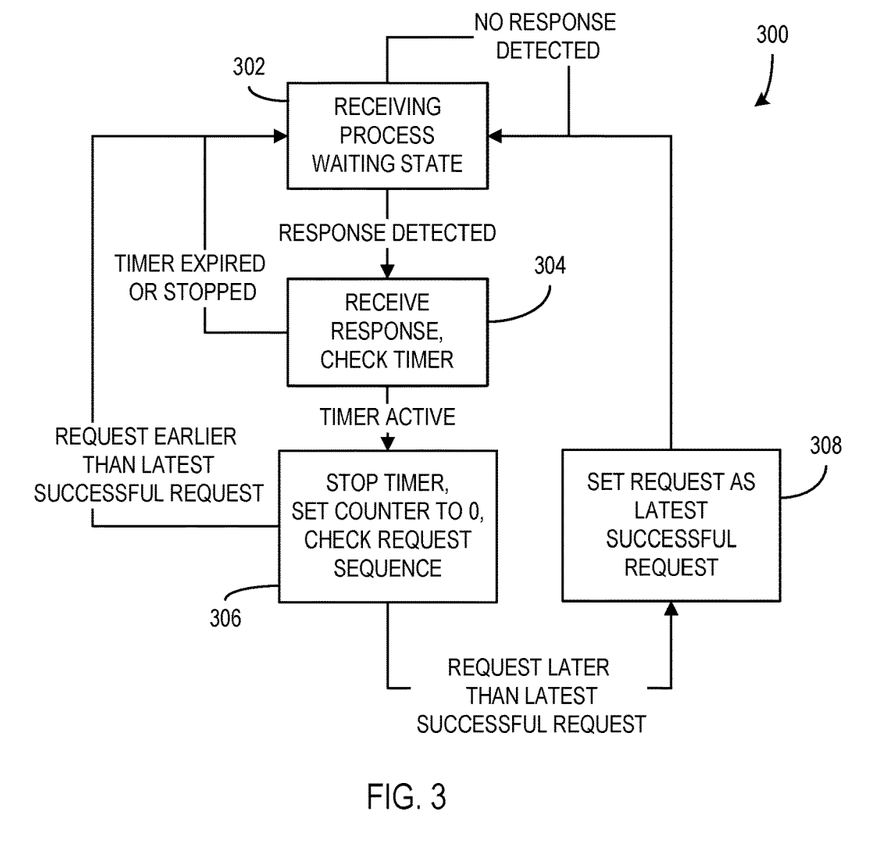
FIG. 3 is a state diagram illustrating operations of a receiving process of a modem malfunction detection system according to an embodiment.

The receiving process 110 of the operating system 106 is configured to receive responses from the modem. FIG. 3 is a state diagram 300 illustrating operations of a receiving process 110 of a modem malfunction detection system 100 according to an embodiment. The receiving process 110 is configured to detect and/or receive responses 111 from the modem 104 in a waiting state 302. For each response 111 detected, the response 111 is received, the request 109 associated with the response 111 is determined based on a request ID included in the response 111, and the timer state 120 of the timer 112 associated with that request 109 is checked at 304. If the timer state 120 is inactive (e.g., the timer 112 has stopped or expired), the response 111 is discarded and no further processing is done for this response (the receiving process 110 returns to the waiting state 302). Alternatively, if the timer state 120 is active (e.g., the timer 112 is still running), the timer 112 is stopped (e.g., the timer state 120 is set to inactive) and the failed request counter 124 of the operating system 106 is set to zero, at 306. It should be understood that, because the response 111 was received within the time allotted and prior to the expiration time 118, it is considered a successful response and, thus the failed request counter 124, which is configured to indicate a quantity or number of consecutive failed requests, is reset. In alternative examples, instead of resetting the failed request counter 124 to zero, it may be decremented by 1 or another value based on receiving a successful response. Additionally, at 306, the request sequence is checked, which includes comparing the start time of the request 109 associated with the response 111 that was just received to the start time of the latest successful request 122. If the request 109 associated with the recently received response 111 occurred after the latest successful request 122, then the request 109 of the recently received response 111 is set as the latest successful request 122 at 308. It should be understood that the OS is configured to track the "latest successful request 122" from among the instantiated request timers 112. The latest successful request 122 is that most recent request 109 (based on start time 116) for which a response 111 has been received prior to the expiration time 118. Alternatively, if the request 109 of the current response 111 occurred earlier than the latest successful request 122, no further processing is needed for this response 111 (the receiving process 110 returns to the waiting state 302).

Figure 4:
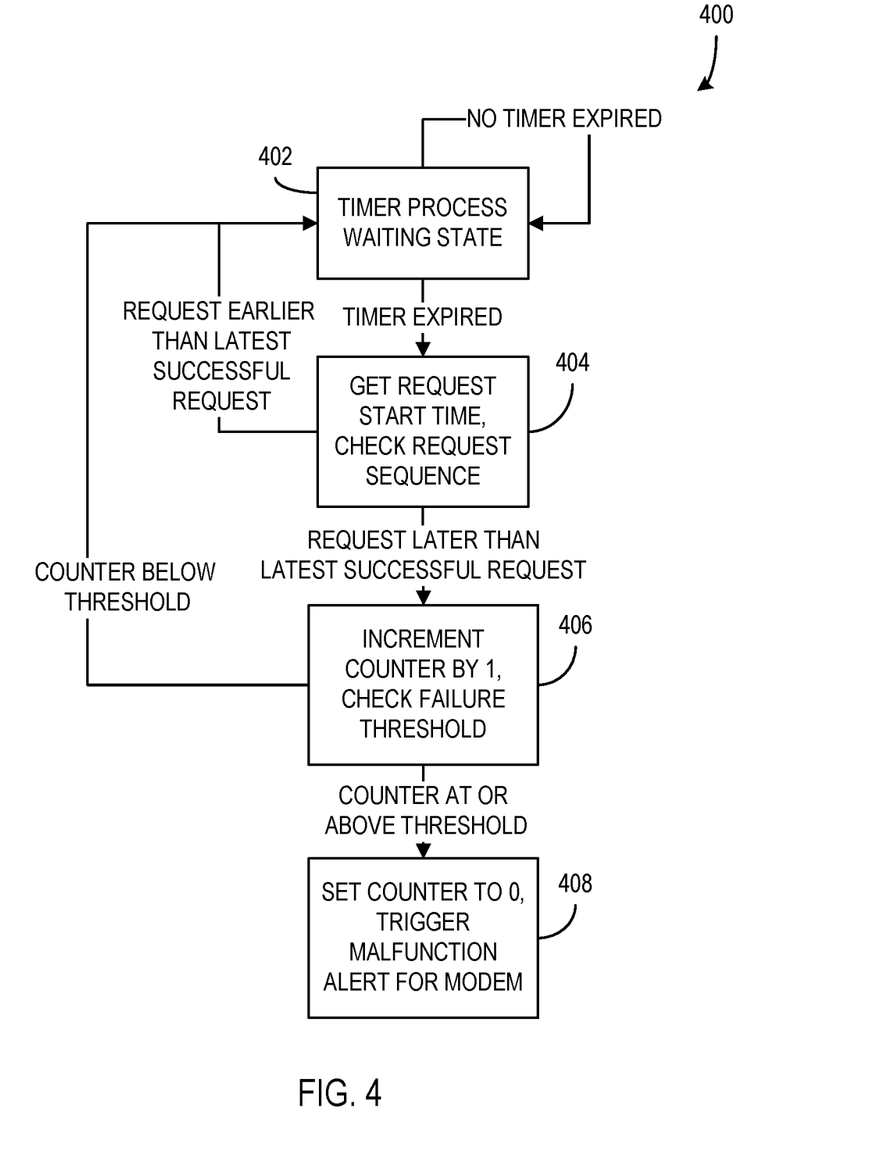
FIG. 4 is a state diagram illustrating operations of a timer process of a modem malfunction detection system according to an embodiment.

The timer process 126 is configured to run whenever a timer 112 expires (e.g., the expiration time 118 of a request timer 112 is reached). FIG. 4 is a state diagram 400 illustrating operations of a timer process 126 of a modem malfunction detection system 100 according to an embodiment. A timer expiration may be detected during a waiting state 402 of the timer process 126 using a notification from the OS 106, wherein the OS 106 is configured to track timer 112 progress based on the start time 116 and expiration time 118 provided by the sending process 108 as described above. Upon a timer 112 expiring, the timer process 126 gets the start time 116 of the request 109 and checks the request sequence at 404. As with the receiving process 110 described above, checking the request sequence includes comparing the start time 116 of the expired request timer 112 to the start time 116 of the latest successful request 122. If the start time 116 of the expired request timer 112 is before the latest successful request 122, no further processing is needed for the expired timer 112 and the timer process 126 returns to the waiting state at 402. Alternatively, if the start time 116 of the expired request timer 112 is after the latest successful request 122, the failed request counter 124 is incremented by one at 406. The failed request counter 124 tracks the number of consecutive requests that have failed (e.g., the associated request timers have expired) since the latest successful request 122. Further, at 406, the failed request counter 124 is compared to a failed request threshold, or failure threshold 127, and, if the failed request counter 124 is less than or below the threshold, no further processing is needed for this request timer 112 (the timer process 126 returns to the waiting state at 402). Alternatively, if the failed request counter 124 is greater than or above the threshold, the failed request counter 124 is reset to zero and a malfunction alert associated with the modem 104 is triggered at 408, indicating that the modem 104 is malfunctioning.

The failure threshold, or failed request counter threshold, provides flexibility in dealing with various systems that have various characteristics of transient errors. It provides a way for this method to adapt and be used in various systems (e.g., the failure threshold can be set for each specific system and/or dynamically adjusted to better fit systems). In some examples, the failure threshold may be adjusted by a user of the system and/or automatically by the OS of the system to tune the performance of the described modem malfunction detection (e.g., the threshold may be increased if too many malfunction alerts are being triggered or lowered if recovery from modem malfunctions are delayed).

The description herein is primarily directed to detecting the malfunction of a modem, such as a mobile broadband (MBB) modem, but in alternative examples, the computing device may use another type of modem or networking component (e.g., Wi-Fi components, BLUETOOTH components, near field communication (NFC) components, etc.) that is configured to operate with a request-response protocol as described herein. Further, while the block diagram of FIG. 1 features one modem, in other examples, multiple modems or other networking components may be monitored by the disclosure without departing from the description herein. Each modem of the computing device may be associated with specific sending, receiving, and timer processes as described herein.

In some examples, the recovery actions taken by the OS or other components of the computing system include non-intrusive recovery of the modem by resetting the modem, restarting the modem, uninstalling and reinstalling software associated with the modem, verification of the state of the modem, and/or notifying a user of the modem's malfunction. In further examples, the OS (e.g., MICROSOFT® WINDOWS®) has telemetry features that may be of use in conjunction with the malfunction detection system described herein. For instance, data associated with detected malfunctions may be provided to the telemetry systems of the OS for analysis and further malfunction avoidance processes (e.g., use of data analysis and machine learning to predict and/or avoid future malfunctions).

Figure 5:
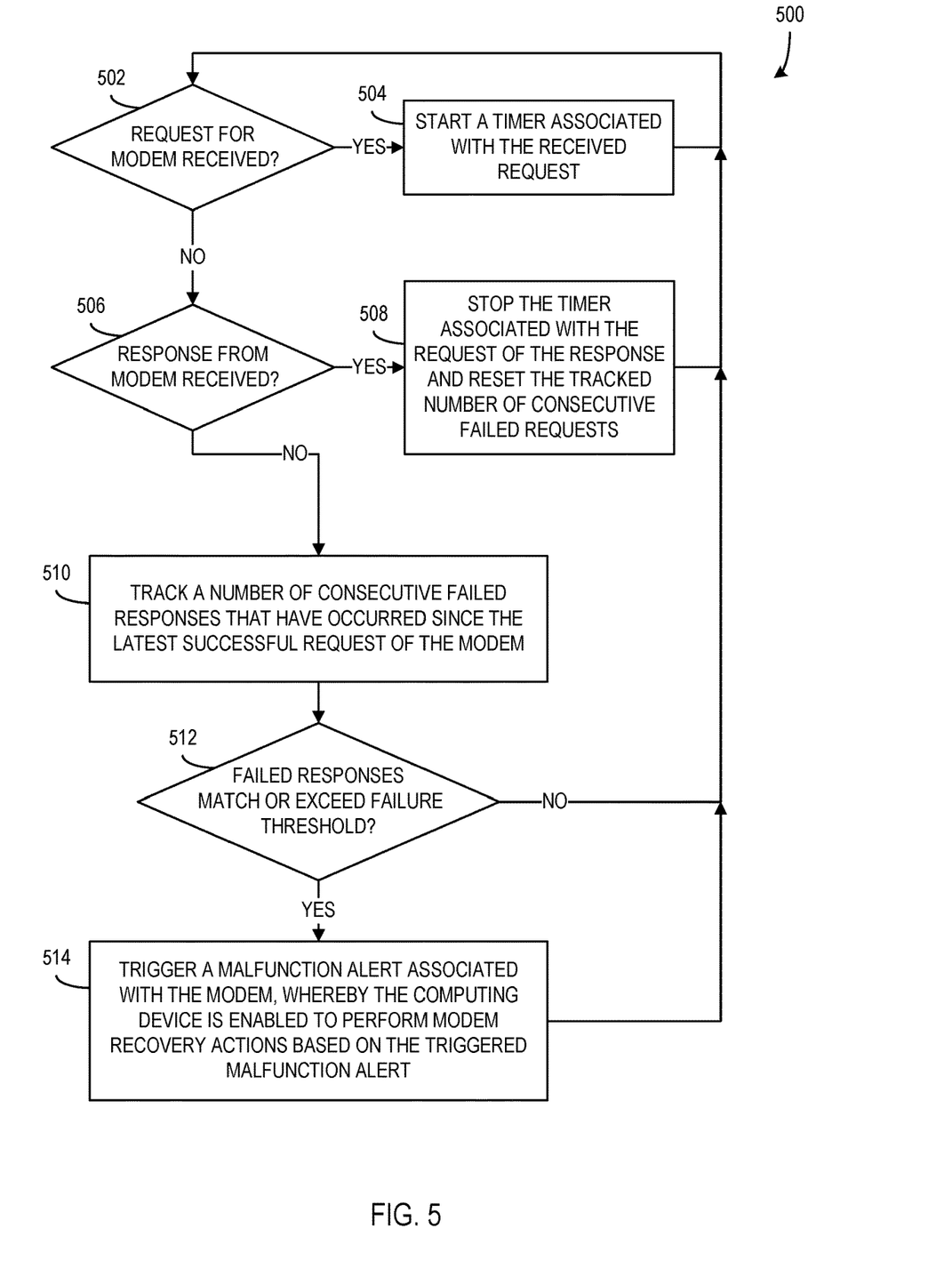
FIG. 5 is a flowchart illustrating a method of detecting malfunction of a modem based on response pattern according to an embodiment.

FIG. 5 is a flowchart illustrating an exemplary method 500 of detecting malfunction of a modem based on response pattern according to an embodiment. It should be understood that the method of FIG. 5 may be implemented by components of a computing system such as the OS and/or other components of the computing device 102 of FIG. 1.

At 502, if a request for the modem is received, the process proceeds to 504, where a timer associated with the received request is started as described herein. Alternatively, if no request for the modem is received, the process proceeds to 506. At 506, if a response to a request is received, the process proceeds to 508, where the timer associated with the request of the received response is stopped and a number of consecutive failed requests that have occurred since the latest successful request is reset as described herein. Alternatively, if no response to a request is received, the process proceeds to 510.

At 510, the number of consecutive failed requests, or failures to respond to requests, that have occurred since the latest successful request of the modem is tracked (e.g., failed requests are indicated when a timer expires before a response associated with the request of the timer is received and the timer is stopped and/or deactivated). At 512, if the number of consecutive failed responses match or exceed the failure threshold of the modem, the process proceeds to 514. Alternatively, if the number of consecutive failed requests does not match or exceed the failure threshold, the process returns to 502.

At 514, a malfunction alert associated with the modem is triggered, whereby the computing device is enabled to perform modem recovery actions based on the triggered malfunction alert. In some examples, triggering the malfunction alert includes at least one of resetting the modem, restarting the modem, uninstalling and reinstalling software associated with the modem, verification of the state of the modem, and/or notifying a user of the modem's malfunction.

The operations 502-504 represent functionality of the sending process, 506-508 represent functionality of the receiving process, and 510-514 represent functionality of the timer process as described above. While the flowchart of FIG. 5 shows the three sets of operations being performed in sequence, it should be understood that, in some examples, the processes are performed in a different order and/or substantially simultaneously in parallel processes (e.g., a request for the modem may be received at substantially the same time as a response to another request is received and each of the request and response may be handled by the respective processes in parallel or otherwise substantially simultaneously).

Figure 6:
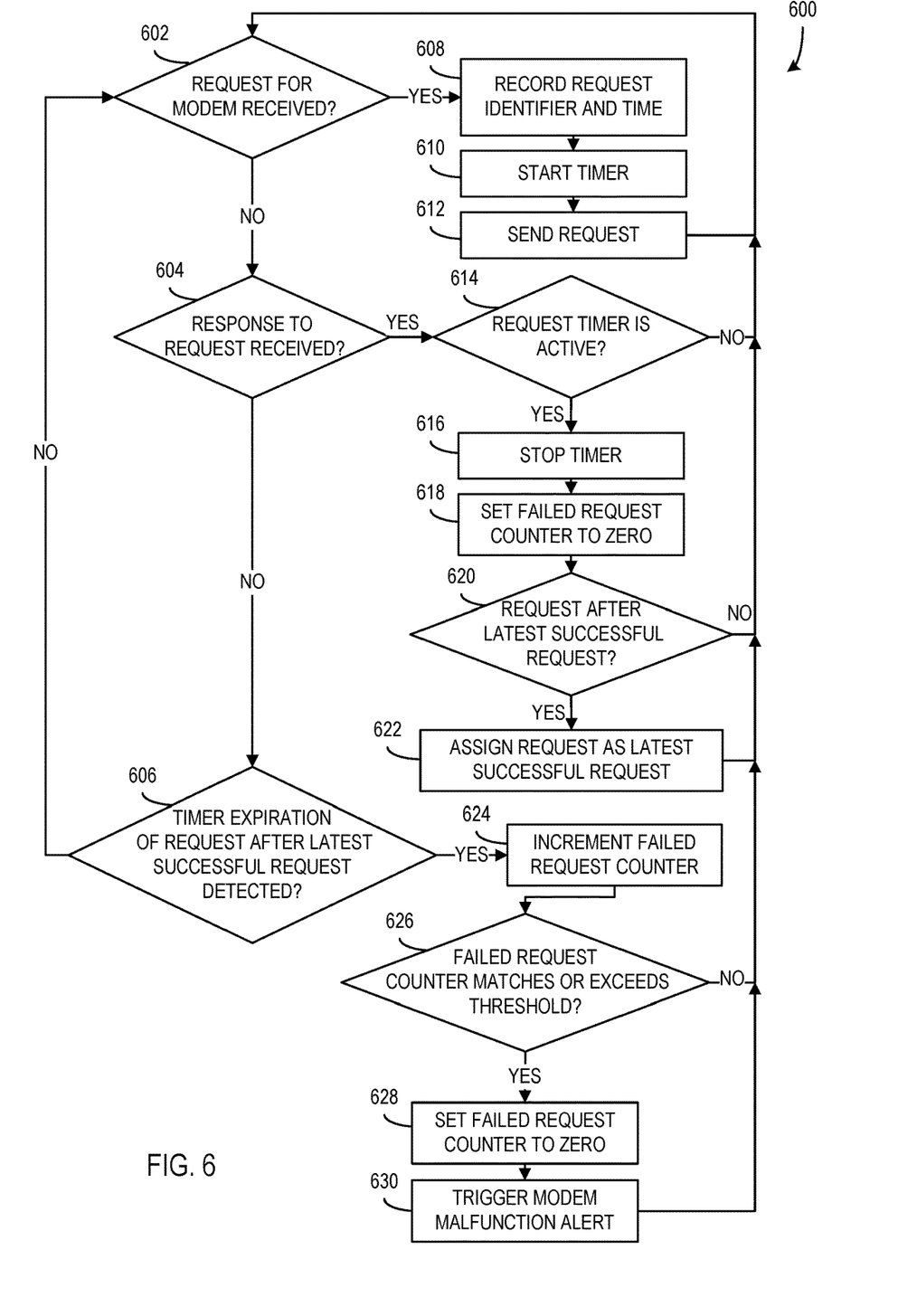
FIG. 6 is a flowchart illustrating a method of detecting malfunction of a modem based on response pattern using a failed request counter and a last successful request according to an embodiment.

FIG. 6 is a flowchart illustrating an exemplary method 600 of detecting malfunction of a modem based on response pattern using a failed request counter and a latest successful request according to an embodiment. It should be understood that the method of FIG. 6 may be implemented by components of a computing system such as the OS and/or other components of the computing device 102 of FIG. 1.

At 602, if a request for the modem is received, the process proceeds to 608. Alternatively, if no request for the modem is received, the process proceeds to 604. At 604, if a response to a request is received, the process proceeds to 614. Alternatively, if no response to a request is received, the process proceeds to 606. At 606, if a timer expiration of a request that is after the latest successful request is detected, the process proceeds to 624. Alternatively, if no timer expiration is detected or if the request that expired is not after the latest successful request, the process returns to 602. The operations 602, 604, and 606 represent functionality of the sending process, receiving process, and timer process respectively as described above. While the flowchart 600 of FIG. 6 shows the three operations being performed in sequence, it should be understood that, in some examples, the processes are performed in a different order and/or substantially simultaneously in parallel processes.

At 608, the sending process is triggered (e.g., the sending process transitions from a waiting state as described above with respect to FIG. 2) and a request identifier and start time of the received request are recorded. At 610, the timer is started and at 612, the request is sent to the modem. The process then returns to 602. In some examples, the started timer is a request timer component (e.g., request timer 112 of FIG. 1) that includes an expiration time and a timer state in addition to the request ID and start time. Additionally, or alternatively, the request timer may include a time period or interval that may be used to determine the expiration of the timer in reference to the recorded start time (e.g., a time interval of ten seconds is used to calculate an expiration time that is ten seconds later than the start time).

At 614, if the request timer of the received response is active, the process proceeds 616. Alternatively, if the request timer is inactive, the process returns to 602. At 616, the request timer of the received response is stopped and, at 618, the failed request counter is set to zero. At 620, if the request occurred after the latest successful request, the request is assigned as the latest successful request at 622 and the process returns to 602. Alternatively, if the request did not occur after the latest successful request, the process returns to 602.

At 624, the failed request counter is incremented (e.g., increased by one). At 626, if the failed request counter matches or exceeds a defined failure threshold, the process proceeds to 628. Alternatively, if the failed request counter is less than the defined failure threshold, the process returns to 602. At 628, the failed request counter is set to zero and, at 630, a modem malfunction alert is triggered.

Additional Example Scenarios

Aspects of the disclosure enable various additional scenarios, such as next described.

In an example, a computing device is configured to include an operating system (OS) and two modem devices that are used for connecting with and communicating over networks. The OS receives a first request to be sent to the first modem. A sending process of the OS records the request identifier and start time of the request, starts a timer associated with the request, and sends the request to the first modem. The started timer includes the recorded request identifier, the start time, an expiration time, and a timer status, which is set to active when the timer is started.

Later, the OS receives a second request that is to be sent to the second modem. Another sending process of the OS that is associated with the second modem handles the second request in substantially the same way that the first sending process handled the first request above. While the second request is being processed, a receiving process of the OS that is associated with the first modem receives a response to the first request. The receiving process is running in parallel with the sending processes (e.g., on a separate thread) and is configured to receive and process responses to requests as described herein.

The receiving process accesses the response and identifies a request identifier that is included therein. The receiving process then finds the timer associated with the request identifier from the response. The timer is still active, meaning it has not been stopped or expired yet, so the response is considered a successful response. The receiving process stops the timer and sets the timer status to inactive. Further, because a successful response has been received, a failed request counter of the first modem is set to zero. Additionally, the receiving process checks the request sequence by comparing the start time of the timer associated with the received response with the start time of the timer associated with the latest successful request. If the start time of the timer is later than the start time of the latest successful request, the request associated with the timer is assigned as the new latest successful request.

In a related example, a timer process of the OS that is associated with the second modem detects that the timer associated with the second request has expired. The timer process obtains the start time of the expired timer and compares it to the start time of the latest successful request. In this case, the start time of the expired timer is later than the start time of the latest successful request, so the expired timer indicates a failed request that should be tracked. The timer process increments the failed request counter of the second modem by one and then compares the incremented counter to the failure threshold of the second modem. The failure threshold of the second modem is set to five consecutive failed requests and the failed request counter is four, so the timer process returns to a waiting state without triggering a malfunction alert.

Later, the timer process detects the expiration of another timer associated with the second modem. As a result of this expiration, the failed request counter of the second modem is incremented to five and, when compared to the failure threshold, the failed request counter matches. As a result of the match, the timer process resets the failed request counter of the second modem to zero and triggers a malfunction alert for the second modem. As a result of the triggered malfunction alert, the OS restarts the second modem as a first modem recovery action. After restarting, the second modem begins to function properly.

Exemplary Operating Environment

Figure 7:
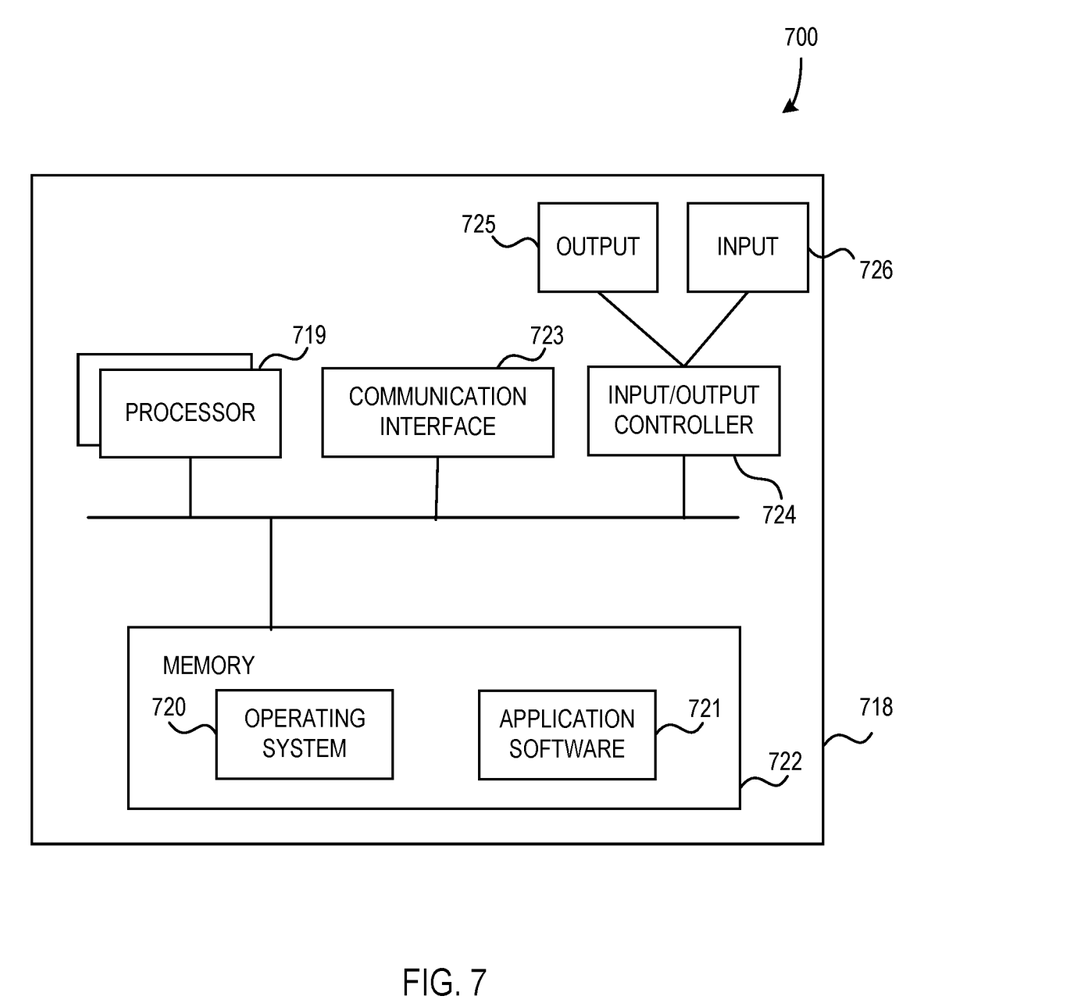
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, detecting malfunction of modems based on response patterns as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for detecting malfunction of a modem of a computing device comprises: the modem of the computing device; at least one processor of the computing device; and at least one memory comprising computer program code, the at least one memory and the computer program code configured to, with the at least one processor, cause the at least one processor to: based on receiving a request to be sent to the modem, start a timer associated with the received request; based on receiving a response to the request from the modem, stop the timer associated with the request; track a number of consecutive failed requests that have occurred since a latest successful request of the modem, wherein a failed request occurs when a timer associated with a request expires prior to being stopped based on receiving a response to the request; and based on the tracked number of consecutive failed requests matching or exceeding a failure threshold of the modem, trigger a malfunction alert associated with the modem, whereby the computing device is enabled to perform modem recovery actions based on the triggered malfunction alert.

A computerized method for detecting malfunction of a modem of a computing device comprises: based on receiving a request to be sent to the modem, starting, by a processor, a timer associated with the received request; based on receiving a response to the request from the modem, stopping, by the processor, the timer associated with the request; tracking, by the processor, a number of consecutive failed requests that have occurred since a latest successful request of the modem, wherein a failed request occurs when a timer associated with a request expires prior to being stopped based on receiving a response to the request; and based on the tracked number of consecutive failed requests matching or exceeding a failure threshold of the modem, triggering, by the processor, a malfunction alert associated with the modem, whereby the computing device is enabled to perform modem recovery actions based on the triggered malfunction alert.

One or more computer storage media having computer-executable instructions for detecting malfunction of a modem of a computing device that, upon execution by a processor, cause the processor to at least: based on receiving a request to be sent to the modem: record a request identifier and a request time of the received request; start a timer associated with the received request; and send the received request to the modem; based on receiving a response to the request from the modem: obtain a timer state of the timer associated with the request; based on the timer state indicating the timer is active, stop the timer, wherein the timer state of the timer is set to inactive, and set a failed request counter of the modem to zero; and based on the request associated with the received response occurring after a latest successful request of the modem, assign the request associated with the received response as the latest successful request of the modem; based on detecting an expiration of the timer associated with the request and the request occurring after the latest successful request of the modem: increment the failed request counter of the modem; and based on the incremented failed request counter matching or exceeding a failure threshold of the modem, set the failed request counter of the modem to zero and trigger a malfunction alert associated with the modem, whereby the computing device is enabled to perform modem recovery actions based on the triggered malfunction alert.

Alternatively, or in addition to the other examples described herein, examples include any combination of the following:
- wherein starting the timer associated with the received request further includes: recording a request identifier and a start time of the received request; associating the request identifier and the start time with the timer; starting the timer; and setting a timer state of the timer to active; wherein stopping the timer associated with the request is further based on determining that the timer state of the timer associated with the request is set to active, and stopping the timer further includes setting the timer state of the timer to inactive; and further comprising setting the timer state of the timer to inactive based on detecting an expiration of the timer.
- wherein tracking then number of consecutive failed requests further includes: based on detecting an expiration of the timer, determining that the timer state of the timer is set to active, and determining that the request associated with the timer occurred after the latest successful request of the modem, incrementing a failed request counter associated with the modem; based on receiving a response to a request and determining that the timer state of the timer associated with the request is set to active, setting the failed request counter to zero; and based on triggering the malfunction alert associated with the modem, setting the failed request counter to zero; wherein the failed request counter matching or exceeding the failure threshold of the modem indicates that the tracked number of consecutive failed requests matches or exceeds the failure threshold of the modem.
- further comprising, based on receiving a response to a request, determining that the timer state of the timer associated with the request is set to active, and determining that the request occurred later than the latest successful request, assigning, by the processor, the request associated with the received response as the latest successful request of the modem.
- wherein receiving the request to be sent to the modem and starting the timer are performed by a sending process of the computing device; wherein receiving the response to the request and stopping the timer associated with the request are performed by a receiving process of the computing device; wherein detecting the expiration of the timer and triggering the malfunction alert associated with the modem are performed by a timer process; and wherein the sending process, receiving process, and timer process perform operations in parallel.
- further comprising, based on receiving instructions for adjusting the failure threshold of the modem, adjusting, by the processor, the failure threshold of the modem according to the received instructions.
- wherein triggering the malfunction alert further includes at least one of resetting the modem, restarting the modem, uninstalling and reinstalling software associated with the modem, verification of the state of the modem, or notifying a user of the modem's malfunction.
- further comprising: based on receiving requests to be sent to modems of a plurality of modems, start a timer associated with each received request and the modem to which the received request is to be sent; based on receiving responses to the requests from the modems of the plurality of modems, stop the timer associated with each request; track consecutive failed requests that have occurred since latest successful requests of the modems of the plurality of modems, wherein a failed request occurs when a timer associated with a request expires prior to being stopped based on receiving a response to the request; based on the tracked consecutive failed requests matching or exceeding failure thresholds of the modems of the plurality of modems, trigger malfunction alerts associated with each modem of the plurality of modems for which a failure threshold was matched or exceeded, whereby the computing device is enabled to perform modem recovery actions associated with the modems of the plurality of modems based on the triggered malfunction alert.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute, based on receiving a request to be sent to the modem, exemplary means for starting, by a processor, a timer associated with the received request; based on receiving a response to the request from the modem, exemplary means for stopping, by the processor, the timer associated with the request; exemplary means for tracking, by the processor, a number of consecutive failed requests that have occurred since a latest successful request of the modem, wherein a failed request occurs when a timer associated with a request expires prior to being stopped based on receiving a response to the request; and based on the tracked number of consecutive failed requests matching or exceeding a failure threshold of the modem, exemplary means for triggering, by the processor, a malfunction alert associated with the modem, whereby the computing device is enabled to perform modem recovery actions based on the triggered malfunction alert.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for detecting malfunction of a modem of a computing device based on a response pattern, the system comprising:
    the modem of the computing device;
    at least one processor of the computing device; and
    at least one memory comprising computer program code, the at least one memory and the computer program code configured to, with the at least one processor, cause the at least one processor to:
    based on receiving a request to be sent to the modem, start a countdown timer associated with the received request;
    track a quantity of consecutive failed requests that have occurred since a last successful request, wherein a failed request occurs when the countdown timer associated with the request expires prior to being stopped based on receiving the successful response to the request;
    based on receiving a successful response to the request from the modem, stop the countdown timer associated with the request and reset the tracked quantity of consecutive failed requests to zero; and
    based on the tracked quantity of consecutive failed requests matching or exceeding an adaptable failure threshold of the modem, trigger a malfunction alert associated with the modem, whereby the computing device is configured to perform modem recovery actions based on the triggered malfunction alert.

2. The system of claim 1, wherein starting the countdown timer associated with the received request further includes:
    recording a request identifier and a start time of the received request;
    associating the request identifier and the start time with the countdown timer;

starting the countdown timer; and setting a timer state of the countdown timer to active;

wherein stopping the countdown timer associated with the request is further based on determining that the timer state of the countdown timer associated with the request is set to active, and stopping the countdown timer further includes setting the timer state of the countdown timer to inactive; and further comprising setting the timer state of the countdown timer to inactive based on detecting an expiration of the countdown timer.

3. The system of claim 2, wherein tracking the quantity of consecutive failed requests further includes:

based on detecting an expiration of the countdown timer, determining that the timer state of the countdown timer is set to active, and determining that the request associated with the countdown timer occurred after the last successful request of the modem, incrementing a failed request counter associated with the modem;

based on receiving the successful response to the request and determining that the timer state of the countdown timer associated with the request is set to active, setting the failed request counter to zero; and based on triggering the malfunction alert associated with the modem, setting the failed request counter to zero;

wherein the failed request counter matching or exceeding the adaptable failure threshold of the modem indicates that the tracked quantity of consecutive failed requests matches or exceeds the adaptable failure threshold of the modem.

4. The system of claim 3, wherein the at least one memory and the computer program code is configured to, with the at least one processor, further cause the at least one processor to, based on receiving the successful to the request, determining that the timer state of the countdown timer associated with the request is set to active, and determining that the request occurred later than the last successful request, assign the request associated with the received response as the last successful request of the modem.

5. The system of claim 1, wherein receiving the request to be sent to the modem and starting the countdown timer are performed by a sending process of the computing device;

wherein receiving the successful response to the request and stopping the countdown timer associated with the request are performed by a receiving process of the computing device;

wherein detecting the expiration of the countdown timer and triggering the malfunction alert associated with the modem are performed by a timer process; and wherein the sending process, receiving process, and timer process perform operations in parallel.

6. The system of claim 1, wherein the at least one memory and the computer program code is configured to, with the at least one processor, further cause the at least one processor to, based on receiving instructions for adjusting the adaptable failure threshold of the modem, adjust the adaptable failure threshold of the modem according to the received instructions.

7. The system of claim 1, wherein triggering the malfunction alert further includes one or more of the following: resetting the modem, restarting the modem, uninstalling and reinstalling software associated with the modem, verification of the state of the modem, and notifying a user of the modem's malfunction.

8. The system of claim 1, wherein the system further includes a plurality of modems; and wherein the at least one memory and the computer program code is configured to, with the at least one processor, further cause the at least one processor to, for each modem of the plurality of modems:

based on receiving a request to be sent to a modem of the plurality of modems, start a countdown timer associated with the received request and the modem to which the received request is to be sent;

track a quantity of consecutive failed requests that have occurred since a last successful request of the modem of the plurality of modems, wherein a failed request occurs when a countdown timer associated with a request expires prior to being stopped based on receiving the successful response to the request;

based on receiving the successful response to the request from the modem of the plurality of modems, stop the countdown timer associated with the request and reset the tracked quantity of consecutive failed requests to zero;

based on the tracked quantity of consecutive failed requests matching or exceeding an adaptable failure threshold of the modem, trigger a malfunction alert associated with the modem of the plurality of modems, whereby the computing device is enabled to perform modem recovery actions associated with the modem of the plurality of modems based on the triggered malfunction alert.

9. A computerized method for detecting malfunction of a modem of a computing device based on a response pattern, the method comprising:

based on receiving a request to be sent to the modem, starting, by a processor, a countdown timer associated with the received request;

tracking, by the processor, a quantity of consecutive failed requests that have occurred since a last successful request, wherein a failed request occurs when a countdown timer associated with a request expires prior to being stopped based on receiving the successful response to the request;

based on receiving a successful response to the request from the modem, stopping, by the processor, the countdown timer associated with the request and resetting the tracked quantity of consecutive failed requests to zero; and based on the tracked quantity of consecutive failed requests matching or exceeding an adaptable failure threshold of the modem, triggering, by the processor, a malfunction alert associated with the modem, whereby the computing device is enabled to perform modem recovery actions based on the triggered malfunction alert.

10. The computerized method of claim 9, wherein starting the countdown timer associated with the received request further includes:

recording a request identifier and a start time of the received request;

associating the request identifier and the start time with the countdown timer;

starting the countdown timer; and setting a timer state of the countdown timer to active;

wherein stopping the countdown timer associated with the request is further based on determining that the timer state of the countdown timer associated with the request is set to active, and stopping the countdown timer further includes setting the timer state of the countdown timer to inactive; and further comprising setting the timer state of the countdown timer to inactive based on detecting an expiration of the countdown timer.

11. The computerized method of claim 10, wherein tracking the quantity of consecutive failed requests further includes:
based on detecting an expiration of the countdown timer, determining that the timer state of the countdown timer is set to active, and determining that the request associated with the countdown timer occurred after the last successful request of the modem, incrementing a failed request counter associated with the modem;
based on receiving the successful response to the request and determining that the timer state of the countdown timer associated with the request is set to active, setting the failed request counter to zero; and
based on triggering the malfunction alert associated with the modem, setting the failed request counter to zero;
wherein the failed request counter matching or exceeding the adaptable failure threshold of the modem indicates that the tracked quantity of consecutive failed requests matches or exceeds the adaptable failure threshold of the modem.

12. The computerized method of claim 11, further comprising, based on receiving the successful response to the request, determining that the timer state of the countdown timer associated with the request is set to active, and determining that the request occurred later than the last successful request, assigning, by the processor, the request associated with the received response as the last successful request of the modem.

13. The computerized method of claim 9, wherein receiving the request to be sent to the modem and starting the countdown timer are performed by a sending process of the computing device;
wherein receiving the successful response to the request and stopping the countdown timer associated with the request are performed by a receiving process of the computing device;
wherein detecting the expiration of the countdown timer and triggering the malfunction alert associated with the modem are performed by a timer process; and
wherein the sending process, receiving process, and timer process perform operations in parallel.

14. The computerized method of claim 9, further comprising, based on receiving instructions for adjusting the adaptable failure threshold of the modem, adjusting, by the processor, the adaptable failure threshold of the modem according to the received instructions.

15. The computerized method of claim 9, wherein triggering the malfunction alert further includes one or more of the following: resetting the modem, restarting the modem, uninstalling and reinstalling software associated with the modem, verification of the state of the modem, and notifying a user of the modem's malfunction.

16. The computerized method of claim 9, wherein the adaptable failure threshold is of the modem is set to five failed requests.

17. One or more computer storage media having computer-executable instructions for detecting malfunction of a modem of a computing device that, upon execution by a processor, cause the processor to at least:
based on receiving a request to be sent to the modem:
record a request identifier and a request time of the received request;
start a countdown timer associated with the received request; and
send the received request to the modem;
based on receiving a successful response to the request from the modem:
obtain a timer state of the countdown timer associated with the request;
based on the timer state indicating the countdown timer is active, stop the countdown timer, wherein the timer state of the countdown timer is set to inactive, and set a failed request counter of the modem to zero; and
based on the request associated with the received response occurring after a last successful request of the modem, assign the request associated with the received response as the last successful request of the modem;
based on detecting an expiration of the countdown timer associated with the request and the request occurring after the last successful request of the modem:
increment the failed request counter of the modem; and
based on the incremented failed request counter matching or exceeding an adaptable failure threshold of the modem, set the failed request counter of the modem to zero and trigger a malfunction alert associated with the modem, whereby the computing device is enabled to perform modem recovery actions based on the triggered malfunction alert.

18. The one or more computer storage media of claim 17, wherein receiving the request to be sent to the modem and starting the countdown timer are performed by a sending process of the computing device;
wherein receiving the successful response to the request and stopping the countdown timer associated with the request are performed by a receiving process of the computing device;
wherein detecting the expiration of the countdown timer and triggering the malfunction alert associated with the modem are performed by a timer process; and
wherein the sending process, receiving process, and timer process perform operations in parallel.

19. The one or more computer storage media of claim 17, further comprising, based on receiving instructions for adjusting the adaptable failure threshold of the modem, adjusting, by the processor, the adaptable failure threshold of the modem according to the received instructions.

20. The one or more computer storage media of claim 17, wherein triggering the malfunction alert further includes one or more of the following: resetting the modem, restarting the modem, uninstalling and reinstalling software associated with the modem, verification of the state of the modem, and notifying a user of the modem's malfunction.

* * * * *